US008812350B2

(12) United States Patent
Channabasavaiah et al.

(10) Patent No.: US 8,812,350 B2
(45) Date of Patent: Aug. 19, 2014

(54) SERVICE EVOLUTION APPROACH IN SOA (75) Inventors: KIshore Channabasavaiah, Palatine, IL (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 12/410,541

(22) Filed: Mar. 25, 2009

(65) Prior Publication Data
US 2010/0250326 A1   Sep. 30, 2010

(51) Int. Cl.
*G06Q 10/00*   (2012.01)
(52) U.S. Cl.
USPC .................. 705/7.36; 705/7.12; 705/7.37
(58) Field of Classification Search
USPC ........................................ 705/1.1, 7.11–7.42
See application file for complete search history.

(56) References Cited

U.S. PATENT DOCUMENTS

| 7,987,449 | B1 * | 7/2011 | Marolia et al. | 717/120 |
|---|---|---|---|---|
| 2003/0236822 | A1 * | 12/2003 | Graupner et al. | 709/203 |
| 2007/0282692 | A1 * | 12/2007 | Bishop et al. | 705/26 |
| 2008/0127047 | A1 | 5/2008 | Zhang et al. | |
| 2008/0167929 | A1 | 7/2008 | Cao et al. | |
| 2008/0250071 | A1 | 10/2008 | Norring et al. | |
| 2008/0285481 | A1 | 11/2008 | Hao et al. | |
| 2008/0294408 | A1 | 11/2008 | Padmanabhan | |
| 2009/0198534 | A1 * | 8/2009 | Brown et al. | 705/7 |
| 2009/0307298 | A1 * | 12/2009 | Jaiswal et al. | 709/202 |
| 2010/0023362 | A1 * | 1/2010 | Nguyen et al. | 705/7 |
| 2010/0114618 | A1 * | 5/2010 | Wilcock et al. | 705/7 |
| 2010/0125618 | A1 * | 5/2010 | Dutta et al. | 707/822 |
| 2010/0146037 | A1 * | 6/2010 | Little | 709/203 |
| 2010/0153914 | A1 * | 6/2010 | Arsanjani et al. | 717/110 |

FOREIGN PATENT DOCUMENTS

| KR | 2003041040 A | * | 5/2003 |
|---|---|---|---|
| WO | 2005048066 | | 5/2005 |

\* cited by examiner

*Primary Examiner* — Sujay Koneru
(74) *Attorney, Agent, or Firm* — Patrick J. Daugherty; Driggs, Hogg, Daugherty & Del Zoppo Co., LPA (57) ABSTRACT

Methods, including service methods, articles of manufacture, systems, articles and programmable devices are provided for managing the evolution of a service-oriented architecture service over a service lifecycle. An implemented SOA service is evaluated with respect to each of a plurality of line-of-business business-scope attributes and to each of a plurality of different line-of-business functionality attributes. Sets are determined of each of the business-scope attributes and different functionality attributes, wherein each attribute of each determined set is applicable to the implemented service as a function of the evaluating. Sets of business attribute-service evolution factors and technical attribute-service evolution factors associated with the respective determined attribute sets are selected, and both of the sets of selected business attribute-service evolution factors and technical attribute-service evolution factors are used to re-factor the implemented service into a mature enterprise service in response to a service revision.

15 Claims, 5 Drawing Sheets

PRIOR ART

SERVICE EVOLUTION APPROACH IN SOA

FIELD OF THE INVENTION

The present invention generally describes the management of evolution of services in service-oriented architecture in response to organizational requirements.

BACKGROUND OF THE INVENTION

It is known for organizations to use service-oriented architecture (SOA) methods, systems and governance models to develop and deploy shareable and reusable services which need to evolve over time. However, problems arise from provider-driven SOA models. Vendors may release and implement product or application updates without request by an organization, for example when new product versions are released or maintenance support is dropped for older versions. An organization may be forced to deploy new product releases or revisions independent of need, even if new product capabilities are not useful or required.

Often a product vendor or service provider cannot practically identify all the interdependencies associated with a product revision in order to accurately anticipate problems that may be caused by a revision or update roll-out. A vendor may not be able to perform adequate integration testing without accurately duplicating a client organization infrastructure environment, and such accurate duplication may be impossible or impractical. Consequently, routine testing of product version updates may be deficient in detecting and identifying functional breakage within an organizational information technology (IT) environment-caused by the introduction of the update.

SUMMARY OF THE INVENTION

Methods are provided for managing the evolution of a service-oriented architecture service over a service lifecycle. An implemented SOA service is evaluated with respect to each of a plurality of line-of-business business-scope attributes and to each of a plurality of different line-of-business functionality attributes. Sets are determined of each of the business-scope attributes and different functionality attributes, wherein each attribute of each determined set is applicable to the implemented service as a function of the evaluating. Sets of business attribute-service evolution factors and technical attribute-service evolution factors associated with the respective determined attribute sets are selected, and both of the sets of selected business attribute-service evolution factors and technical attribute-service evolution factors are used to re-factor the implemented service into a mature enterprise service in response to a service revision. Further, methods provide that a programmable device configured by a logic component performs at least one of the evaluating the implemented service, the determining the sets of attributes, the selecting the sets of factors and the re-factoring of the implemented service.

Service methods are also provided comprising deploying applications for managing the evolution of a service-oriented architecture service over a service lifecycle according to the method steps described above, for example by a service provider who offers to implement, deploy, and/or perform functions for others. Still further, articles of manufacture comprising a computer usable medium having a computer readable program code in said medium are provided. Such program code comprises instructions which, when executed on a computer system, cause the computer system to perform one or more method and/or process elements described above for managing the evolution of a service-oriented architecture service over a service lifecycle. Moreover, systems, articles and programmable devices are also provided, configured for performing one or more method and/or process elements of the current invention for managing the evolution of a service-oriented architecture service over a service lifecycle, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description; and
II. Computerized Implementation.

I. General Description

Examples of SOA aspects and governance processes according to the present invention may be found in the following commonly-owned and co-pending U.S. patent applications or issued U.S. patents, the disclosures of which are expressly incorporated herein by reference: "Identifying a Service Oriented Architecture Shared Services Project", filed on Nov. 24, 2008, and assigned application Ser. No. 12/277,280; "Evaluating a Service Oriented Architecture Shared Services Project", filed on Feb. 19, 2009, and assigned application Ser. No. 12/388,533; "Selecting a Service Oriented Architecture Shared Service", filed on Feb. 24, 2009, and assigned application Ser. No. 12/391,426; "Service Oriented Architecture Shared Services Elaboration", filed on Feb. 24, 2009, and assigned application Ser. No. 12/391,728; "Service Oriented Architecture Shared Services Construction", filed on Feb. 25, 2009, and assigned application Ser. No. 12/392,189; "Transitioning to Management of a Service Oriented Architecture Shared Service", filed on Feb. 25, 2009, and assigned application Ser. No. 12/392,567; "Management of a Service Oriented Architecture Shared Service", filed on Feb. 26, 2009, and assigned application Ser. No. 12/393,110; "Service Oriented Architecture Shared Service Escalation", filed on Feb. 24, 2009, and was assigned application Ser. No. 12/391,362; "SOA Policy Versioning", filed on Mar. 25, 2009, and assigned application Ser. No. 12/410,488; "FRAMEWORK FOR VARIATION ORIENTED ANALYSIS FOR SERVICE-ORIENTED ARCHITECTURE", filed on Mar. 25, 2009, and assigned application Ser. No. 12/410,491; "TECHNICAL FEASIBILITY EXPLORATION FOR SERVICE-ORIENTED ARCHITECTURE ENVIRONMENTS", filed on Mar. 25, 2009, and assigned application Ser. No. 12/410,493; "SOA Lifecycle Governance and Management", filed on Mar. 25, 2009, and assigned application Ser. No. 12/410,497; "ENABLING SOA GOVERNANCE USING A SERVICE LIFECYCLE APPROACH", filed on Mar. 25, 2009, and assigned application Ser. No. 12/410,503; "CALIBRATION FRAMEWORK FOR EFFORT ESTIMATION", filed on Mar. 25, 2009, and assigned application Ser. No. 12/410,509; "SERVICE PORTFOLIO APPROACH FOR SOA GOVERNANCE", filed on Mar. 25, 2009, and assigned application Ser. No. 12/410,526; "CAPABILITY AND MATURITY-BASED SOA GOVERNANCE", filed on Mar. 25, 2009, and assigned application Ser. No. 12/410,554; "PRIORITIZATION ENABLEMENT FOR SOA GOVERNANCE", filed on Mar. 25, 2009, and assigned application Ser. No. 12/410,572; and "SOA POLICY ENGINE FRAMEWORK", filed on Mar. 25, 2009, and assigned application Ser. No. 12/410,592.

Figure 1:
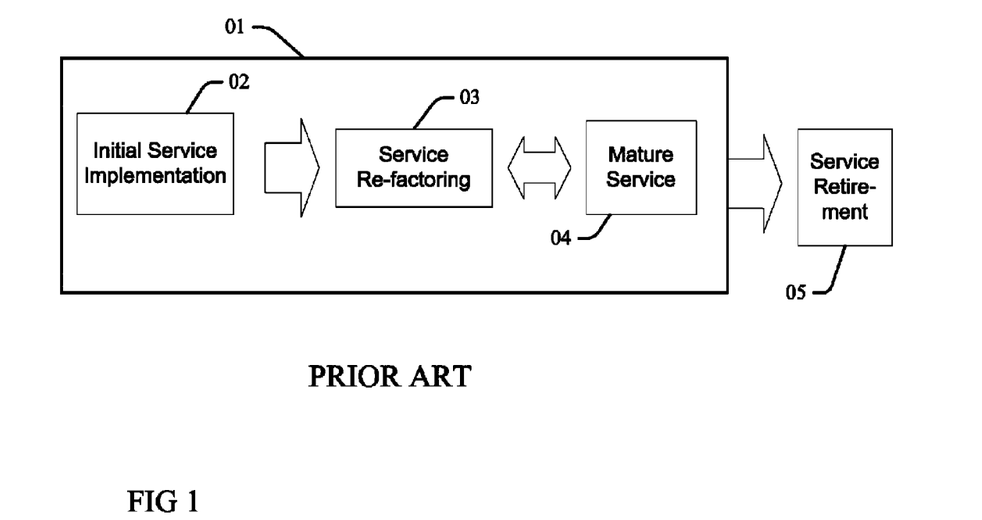
FIG. 1 is a block diagram illustration a prior art product evolution process.

FIG. 1 illustrates a prior art, traditional product evolution process 01 for the adoption and deployment of a service oriented architecture (SOA) service. A service is initially introduced at 02, and then subsequently re-factored at 03 through a revision or new product release by an originating vendor or other entity tasked with maintaining the service, resulting in a mature service at 04. Re-factoring may occur more than once at 03 over the lifespan of the mature service until a service(s) is retired at 05.

Problems may arise with the use of the traditional product evolution process 01 service matured at 04. The evolution of the service at 03 and 04 is not driven by business requirements of a SOA utilizing and incorporating the service, but instead in response to determinations of the service provider (vendor, etc.), for example through the release of new product versions or the dropping of maintenance support for older versions in furtherance of a vendor or service-specific need. Accordingly, an SOA organization often lacks any choice other than to deploy the latest product release even if the new capabilities are not required. As a product vendor cannot practically identify all the interdependencies which may result, or perform extensive integration testing since they do not have every client's infrastructure environment duplicated, service maturation through the prior art traditional product evolution process 01 may lead to "breakage," wherein the matured service causes unanticipated problems within an incorporating SOA environment.

Figure 2:
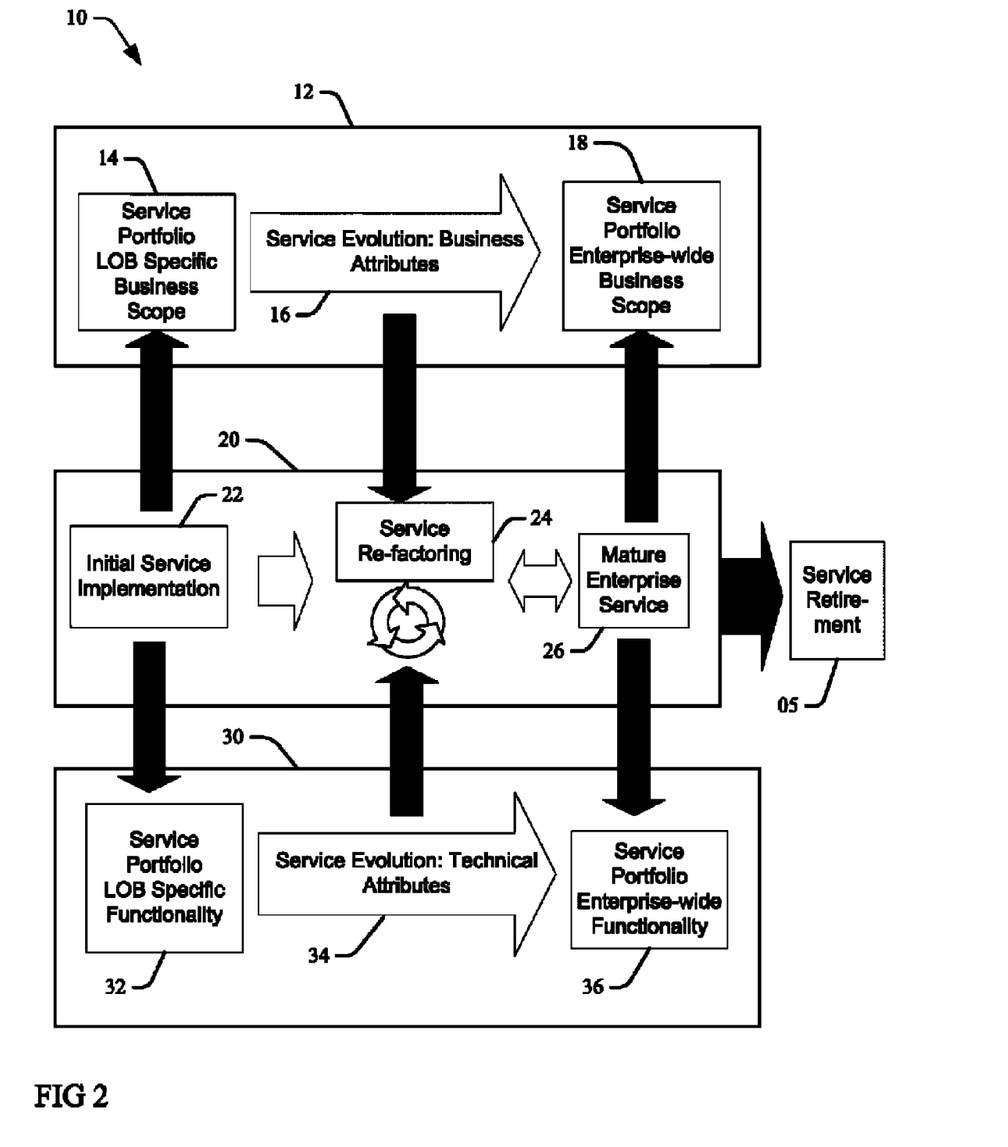
FIG. 2 is a block diagram illustration of a service evolution framework according to the present invention.

FIG. 2 illustrates a Service Evolution (SE) Framework and Approach 10 according to the present invention that provides an overarching and a foundational model for a product evolution process 20 provided for the definition, measurement, monitoring and management of an SOA service or a portfolio of SOA services over its/their lifecycle(s), more particularly mature service(s) realized as part of transformation to an SOA environment by an enterprise utilizing the SOA. The SE Framework 10 includes both a business evolution component 12 and a technical evolution component 30 as two distinct categories. These integral business and technical components 12/30 each include distinct sets of attributes and/or considerations (described more fully below) which individually or collectively influence an overall evolution of a service or a portfolio of services over a lifecycle(s), thereby providing a clear categorization of business and technical attributes 12/30 that influence the service evolution, and which may be leveraged for understanding, measuring and monitoring service evolution. The present SE Framework 10 business evolution component 12 and technical evolution component 30 aspects and considerations further provide for review of interdependencies which results in a better understanding of the overall impact of a service evolution.

More particularly, a service initially implemented at 22 is evaluated with respect to a plurality of specific service portfolio line-of-business (LOB) business-scope attributes 14 of the business evolution component 12. Business-scope LOB attributes 14 thus determined to be applicable to the service implemented at 22 are each utilized in selecting or formulating a plurality of business attribute-service evolution factors 16 for use and application in re-factoring of the service at 24. The service implemented at 22 is also evaluated with respect to a plurality of specific service portfolio LOB functionality attributes 32 of the technical evolution component 30. LOB functionality attributes 32 thus determined to be applicable to the service implemented at 22 are each utilized in selecting or formulating a plurality of technical attribute-service evolution factors 34 for use and application in the re-factoring of the service at 24.

Thus re-factoring the service(s) at 24 comprises using and considering both of the business attribute-service evolution factors 16 and the technical attribute-service evolution factors 34 in response to each product/solution release or update, resulting in a mature enterprise service at 26, the mature service and its attributes further considered in a feedback process for future re-factorings at 24, until the mature service is retired at 05. The mature enterprise service produced at 26 is further a product of compliance or alignment with each of a plurality of service portfolio enterprise-wide business scope requirements, models and/or frameworks 18 of the business evolution component 12, and with each of a plurality of service portfolio enterprise-wide functionality requirements, models and/or frameworks 36 of the technical evolution component 30.

Figure 3:
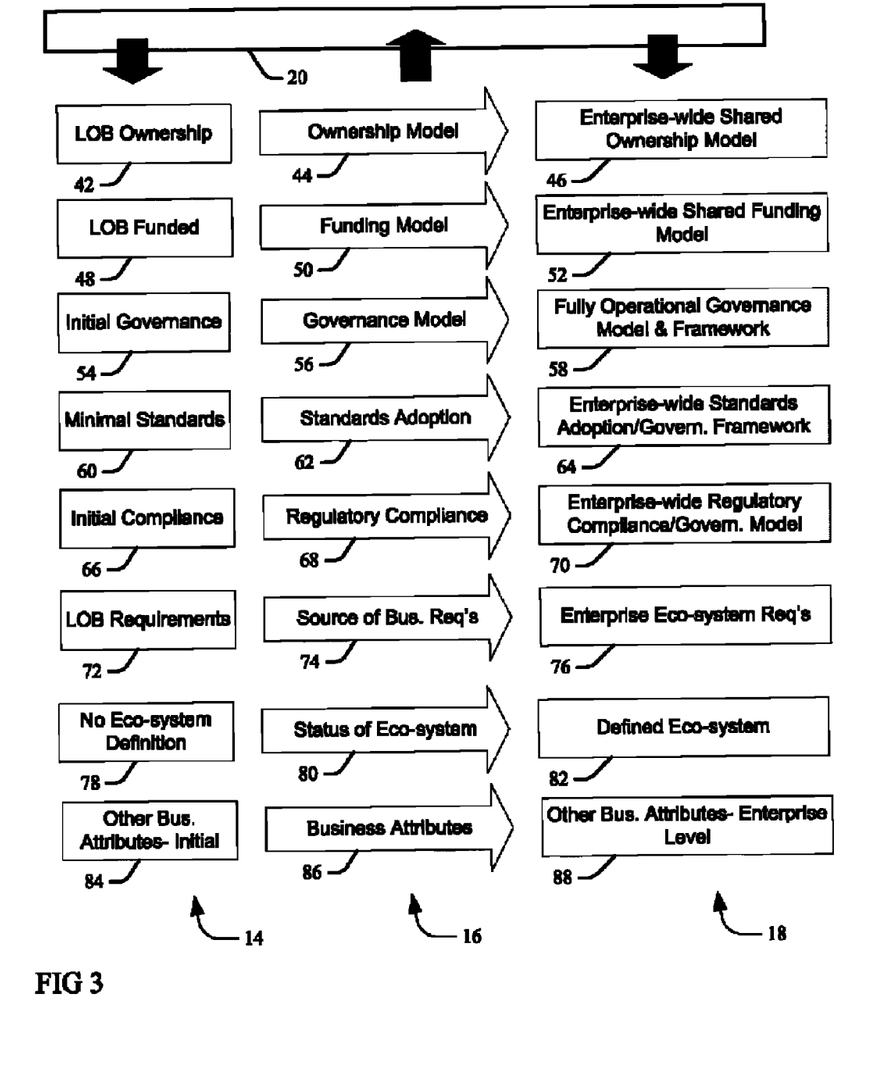
FIG. 3 is a block diagram illustration of an application of business evolution component attributes according to the present invention.

FIG. 3 provides an illustration of one application of the business evolution component 12 LOB business-scope attributes 14, wherein each of a plurality of attributes 14 applicable to the service implemented at 22 results in the selection of an ownership model factor 16 for inclusion and use in re-factoring at 24, each factor 16 thereby producing a mature enterprise service (or service portfolio comprising a plurality of mature, re-factored services) at 26 compliant with a corresponding enterprise-wide business scope requirement or model 18 of the business evolution component 12. Thus, an LOB service ownership model 42 results in the selection of an ownership model factor 44, which results in compliance of the mature enterprise service/portfolio 26 with a enterprise-wide shared ownership model 46. An LOB service funding model 48 results in the selection of a funding model factor 50, which results in compliance of the mature enterprise service/portfolio 26 with an enterprise-wide shared funding model 52. An initial service governance model 54 results in the selection of a governance model factor 56, which results in compliance of the mature enterprise service/portfolio 26 with a fully operational governance model and framework 58. A minimal adoption of standards 60 results in the selection of a standards adoption factor 62, which results in compliance of the mature enterprise service/portfolio 26 with an enterprise-wide adoption of standards based on a defined governance model and framework 64.

Similarly, an initial compliance model 66 (which may include a "no compliance" determination or status) results in the selection of a regulatory compliance model factor 68, which results in an enterprise-wide adoption of regulatory compliance by the mature enterprise service/portfolio 26 based on a defined governance model 70. LOB specific business requirements 72 result in the selection of source-responsive business requirements factors 74, which result in driving the mature enterprise service/portfolio 26 by a set of enterprise eco-system business requirements 76. Recognition of absence of an eco-system definition at 78 results in the selection of an eco-system status factor 80, which results in defining the mature enterprise service/portfolio 26 in view of a well-defined eco-system model 82 including identified entities. Additionally, other business-specific attributes relevant to the initial service and relevant to the overall evolution of the services in the SOA environment may be identified at 84, resulting in the selection of additional business attribute factors 86 which drive the mature enterprise service/portfolio 26 into compliance with the other relevant business-specific attributes on an enterprise level at 88.

Figure 4:
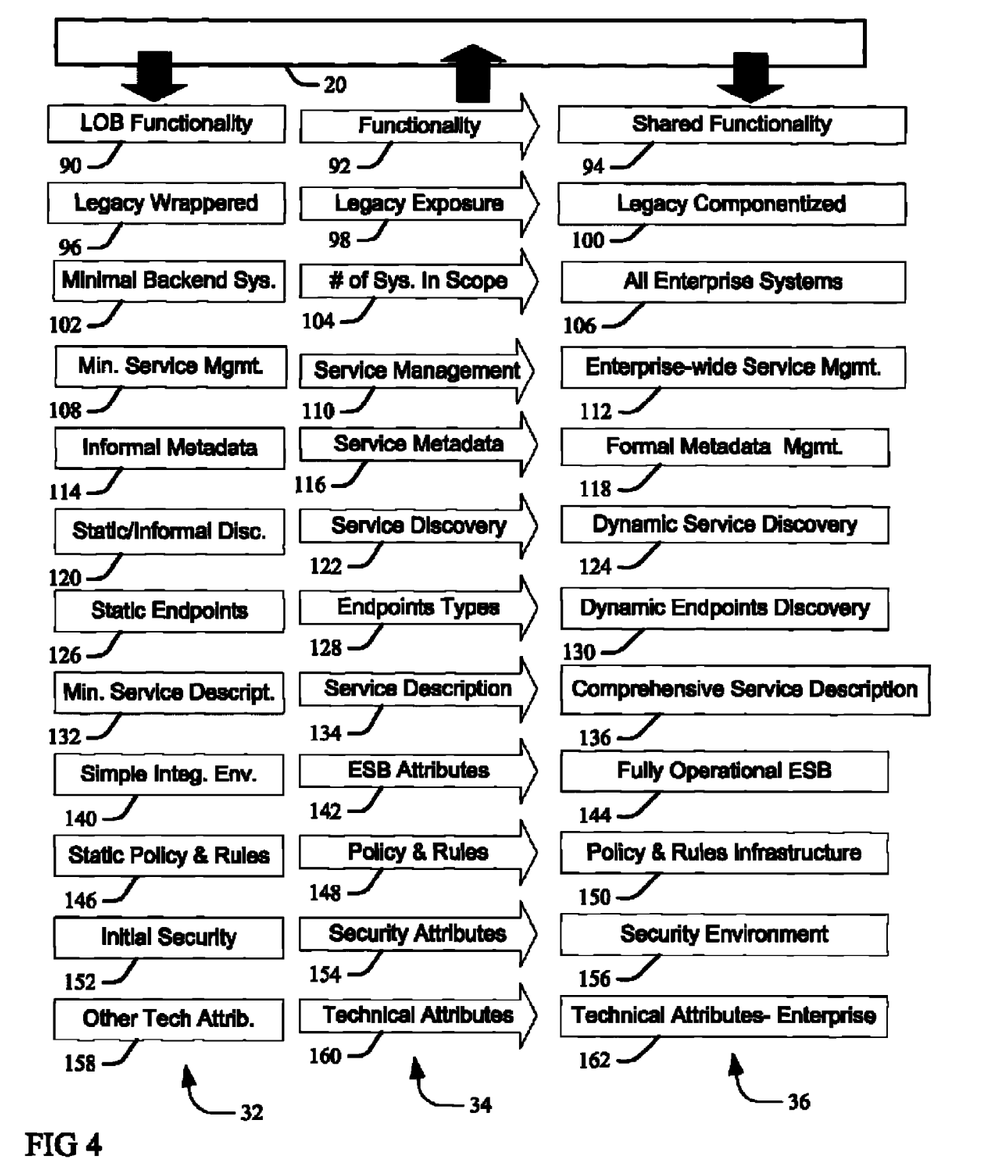
FIG. 4 is a block diagram illustration of an application of technical evolution component attributes according to the present invention.

FIG. 4 provides an illustration of an application of the technical evolution component 30 LOB functionality attributes 32. Each of the plurality of attributes 32 is identified as applicable to the service implemented at 22, resulting in the selection of each of plurality of technical attribute-service evolution factors 34 for use in re-factoring at 24, each factor 34 thereby producing a mature enterprise service/portfolio at 26 compliant with the corresponding service portfolio enterprise-wide functionality requirements 36 of the technical evolution component 30. Thus, an initial LOB-specific service ownership model 90 identified with a service/portfolio results in the selection of a functionality model factor 92, which results in driving the mature enterprise service/portfolio 26 into compliance with a cross-line shared functionality model 94. A legacy function-wrapped attribute 96 of the initial service/portfolio results in the selection of a legacy functionality exposure factor 98, which results in the mature enterprise service/portfolio 26 having componentized legacy functionality 100. Identification of a minimal number of backend systems at 102 results in provision of a scope factor 104 reflecting a number of systems in the scope of the SOA, which results in the mature enterprise service/portfolio 26 reflecting the scope of all enterprise systems at 106. Identification of minimal/initial service management attributes at 108 results in provision of a service management scope factor 110 reflecting the scope of the enterprise, which results in enterprise-wide service management for the mature enterprise service/portfolio 26 at 112.

Informal service metadata management at 114 results in provision of a service metadata factor 116, which results in formal metadata management at 118, for example including provision of a service registry and repository. Static and informal service discovery mechanism(s) at 120 result in provision of a service discovery factor 122, which results in dynamic service discovery at 124. The provision of static end-point types at 126 results in the provision of an end-point type factor 128, which results in dynamic discovery of end-points at 130. A minimal service description 132 (e.g. an initial signature) results in provision of a service description factor 134, which results in a comprehensive service description at 136.

A simple integration environment 140, for example early or no enterprise service business (ESB) environment definition, results in provision of ESB attribute factors 142, which results in a fully operational ESB mature enterprise service/portfolio 26 at 144. Observation of static policies and rules status at 146 (including an observation of an absence of policies or rules) results in provision of a policies and rules factor 148, which provides a fully operational, dynamic and managed policies and rules infrastructure 150 for the mature enterprise service/portfolio 26. An initial security setting determination/identification at 152 results in provision of a security attributes factor 154, resulting in a security environment 156 for the mature enterprise service/portfolio 26 based on enterprise guidelines. Additionally, other technical attributes relevant to an initial service state may be identified at 158, resulting in the selection of additional technical attribute factors 160 which drive the mature enterprise service/portfolio 26 into compliance with the other relevant technical attributes on an enterprise level at 162.

Updates to services at 24 of the SE Framework 10 are thus driven by business requirements, not by the requirements of a vendor or product firm. An organization involving all key stakeholders through the attributes 14/32 and factors 16/34 when contemplating changes to services defines interdependencies, and enables the performing of extensive integration testing in a representative test environment prior to deployment, thereby eliminating potential "breakages." The SE Framework 10 thus enables an organization to regain control over updates and functional changes within their enterprise, with services evolving at 24 based on business needs, and in addition to including specific considerations and attributes 14/32 also provides a high-level view of a method and process for managing service evolution during the lifecycle of a service.

The service evolution attributes 14/32 may be associated with or defined by linear or nonlinear scales, and the scales may further be based on implementation requirements of the SE Framework 10 (FIG. 2). Linear and nonlinear scaling functionality may be implemented as part of a tool/tooling portfolio to monitor, measure and manage service evolution on an on-going basis. Scales may be defined for an evolution of each of the attributes 14/32 dependent on one or more of other scales within the overall framework, or they may be completely independent. In one aspect scale may be utilized to provide enough flexibility for the implementation of the SE Framework 10 without constraining a definition of a scale with limiting boundaries.

The realization of the SE Framework 10 may be based on a sub-set of some of the attributes 14/32, or a superset of an entirety of the attributes 14/32, wherein the sub-set or super-set attributes 14/32 together influence the evolution of a mature service/portfolio at 26. The attributes 14/32 may also be realized as a set of interdependent or unique entities. Monitoring of the attributes 14/32 can be effectively leveraged to manage an SOA transformation strategy within an enterprise. In addition, measures and metrics can be leveraged to influence an overall SOA governance model within an enterprise during different stages of organizational SOA transformation initiatives. In another aspect service retirement at 05 (FIG. 2) of the SE Framework 10 defines a distinct end-point for a service over its lifecycle, which enables a realization model of the SE Framework 10 to provide guidance on a definitive end-point for a service based on both internal and external influences that drive the overall service evolution.

The SE Framework 10 may be realized as part of a larger SOA tool set, or it may be implemented as a distinct tool for managing service evolution for enterprises of all sizes. In addition a SE Framework 10 tool a sub-set thereof may be an integral part of an executive business dashboard and enable business users to manage, monitor and assist in business decision making processes. The audience for a tool implemented based on the details of the SE Framework 10 can include both business and technical end-users. In another aspect, the SE Framework 10 defines an overarching framework for the design, creation and development of evolution models for services in the context of SOA, and may also be applied to other modification and update contexts beyond SOA; for example, the SE Framework 10 can be effectively leveraged to influence the definition and creation of SOA Governance models and associated metrics, measures and tools.

Figure 5:
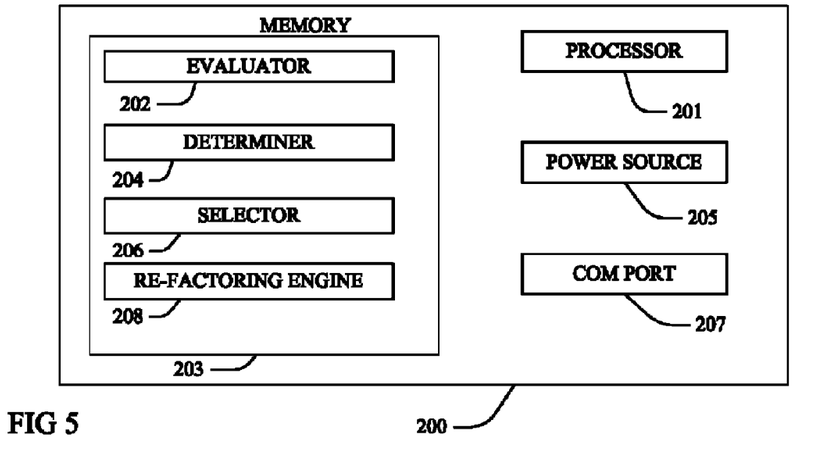
FIG. 5 is a block diagram of a system or device configured to implement a service evolution framework according to the present invention.

FIG. 5 illustrates a programmable device or module 200 configured to implement a service evolution framework according to the present invention, for example as illustrated in FIGS. 2, 3 and 4 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment comprises a central processing unit (CPU) or other processing means 201 in communication with a memory 203 comprising logic components that enable the CPU 201 to perform processes and methods according to the present application, as will be understood through reference to FIGS. 2, 3 and 4 as discussed above. Thus, the memory 203 comprises an Evaluator logic component 202 configured to evaluate an implemented service with respect to both line-of-business business-scope attributes and different line-of-business functionality attributes; a Determiner logic component 204 configured to determine which business-scope attributes and different functionality attributes are applicable to the implemented service; a Selector logic component 206 configured to select sets of business attribute-service evolution factors and technical attribute-service evolution factors associated with the respective determined sets of attributes; and a Re-factoring Engine logic component 208 configured to re-factor an implemented service into a mature enterprise service with both of the selected set of business attribute-service evolution factors and technical attribute-service evolution factors in response to a service revision.

A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 6:
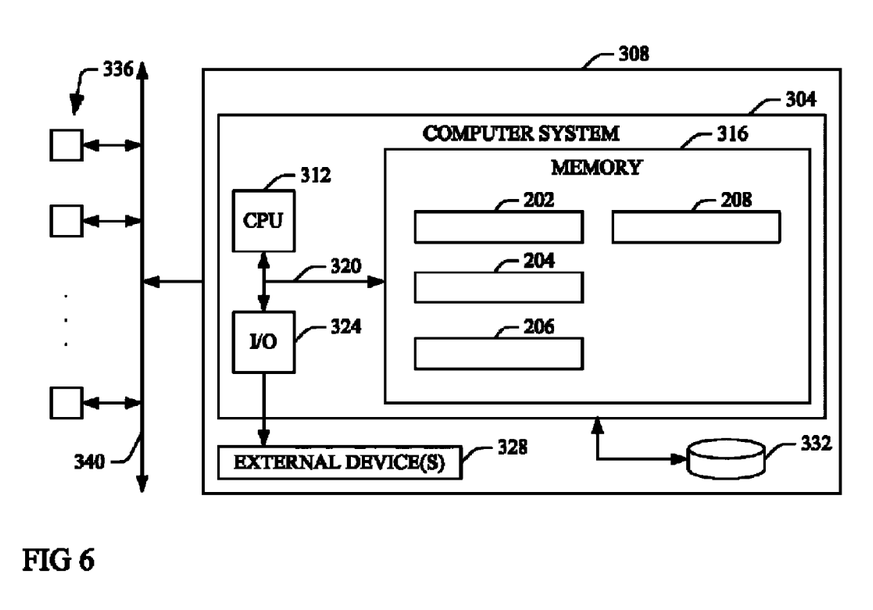
FIG. 6 is a block diagram illustrating a computerized implementation of a method or system for implementing a service evolution framework according to the present invention.

Referring now to FIG. 6, an exemplary computerized implementation of a business services portfolio-centric SOA governance framework according to the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage systems 332. In general, the processing unit 312 executes computer program code, such as the code to implement various components of the process and systems, and devices as illustrated in FIGS. 2-5 and described above, including the Evaluator logic component 202, the Determiner logic component 204, the Selector logic component 206 and the Re-factoring Engine logic component 208, and which are stored in memory 316 and/or storage system 332. It is to be appreciated that two or more, including all, of these components may be implemented as a single component.

While executing computer program code, the processing unit 312 can read and/or write data to/from the memory 316, the storage system 332 (e.g. the, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 6 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). Further, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 2-6 above and described otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for managing the evolution of a service-oriented architecture service over a service lifecycle, comprising:

in response to an update of a product of an implemented service, evaluating, via a processing unit of a programmable device that is configured by a logic component, the implemented service with respect to each of a plurality of line-of-business business-scope attributes, and with respect to each of a plurality of line-of-business functionality attributes that are different from the business-scope attributes;

selecting by the processing unit a set of the plurality of business-scope attributes that are interdependent and applicable to the implemented service as a function of the evaluating the service with respect to the business-scope attributes, wherein the set of business-scope attributes is less than a totality of the plurality of the business-scope attributes and comprises a line of business service ownership model, a line of business service funding model, and an initial service governance model;

selecting by the processing unit a set of business attribute-service evolution factors that are each associated with one of the determined set of business-scope attributes for use in re-factoring the implemented service, wherein the set of business attribute-service evolution factors comprises an ownership model factor that is associated with the line of business service ownership model, a funding model factor that is associated with the line of business service funding model, a governance model factor that is associated with the initial service governance model, and, in response to recognizing an absence of an eco-system definition, an eco-system status factor that defines a mature enterprise service portfolio as a function of identified entities;

selecting by the processing unit a set of the plurality of functionality attributes that are interdependent and applicable to the implemented service as a function of the evaluating the service with respect to the functionality attributes, wherein the set of functionality attributes is less than a totality of the plurality of the different functionality attributes and comprises a minimum number of backend systems, static end-point types, and an initial security setting identification;

selecting by the processing unit a set of technical attribute-service evolution factors that are each associated with one of the determined set of the functionality attributes and different from the business attribute-service evolution factors, for use in re-factoring the implemented service, wherein the set of technical attribute-service evolution factors comprises a scope factor that is associated with the minimum number of backend systems, an end-point type factor that is associated with the static end-point types, a security attributes factor that is associated with the initial security setting identification, and, in response to an observation of an absence of a static policy, a static policy factor that provides an operational policy; and re-factoring by the processing unit the implemented service with both of the selected set of business attribute-service evolution factors and the selected set of technical attribute-service evolution factors.

2. The method of claim 1, wherein the step of re-factoring the implemented service with both of the selected set of business attribute-service evolution factors and the selected set of technical attribute service evolution factors comprises generating a mature enterprise service as a product of alignment with each of a plurality of service portfolio enterprise-wide business scope requirements, and with each of a plurality of service portfolio enterprise-wide functionality requirements that are different from the business scope requirements, to comply with each of an enterprise-wide shared ownership model, an enterprise-wide shared funding model, and a fully operational governance framework.

3. The method of claim 1, further comprising:
defining by the processing unit a distinct end-point for the implemented service over its lifecycle as a function of an influence driving the re-factoring; and
providing for retirement of the implemented service by the processing unit upon an occurrence of the distinct end-point.

4. The method of claim 1, further comprising:
incorporating the programmable device within an executive business dashboard; and
enabling a business user to manage the at least one of the steps of evaluating the implemented service, determining the sets of business-scope or functionality attributes, selecting the sets of business attribute-service evolution or technical attribute-service evolution factors and re-factoring of the implemented service performed by the programmable device through the executive business dashboard.

5. The method of claim 1, further comprising:
defining by the processing unit at least one of the business-scope attributes and the functionality attributes that are applicable to the implemented service with a scale; and
scaling by the processing unit the at least one applicable attribute defined with the scale as a function of an implementation requirement.

6. The method of claim 5, further comprising:
implementing the scaling as part of a tool configured to monitor and manage evolution of the implemented service.

7. The method of claim 6, further comprising:
defining the scale as a function of another scale of another of the business-scope attributes and the functionality attributes that are applicable to the implemented service.

8. The method of claim 1, further comprising a service provider deploying at least one of the programmable device and the logic component.

9. An article of manufacture, comprising:
a computer readable tangible storage device having computer-readable program code embodied therewith, the computer-readable program code comprising instructions which, when executed on a computer system comprising a processing unit, cause the computer system processing unit to:
evaluate, in response to an update of a product of an implemented service, an implemented service with respect to each of a plurality of line-of-business business-scope attributes, and with respect to each of a plurality of line-of-business functionality attributes that are different from the business-scope attributes;
select a set of the plurality of business-scope attributes that are interdependent and applicable to the implemented service as a function of the evaluating the service with respect to the business-scope attributes, wherein the set of business-scope attributes is less than a totality of the plurality of the business-scope attributes and comprises a line of business service ownership model, a line of business service funding model, and an initial service governance model;
select a set of business attribute-service evolution factors that are each associated with one of the determined set of business-scope attributes for use in re-factoring the implemented service, wherein the set of business attribute-service evolution factors comprises an ownership model factor that is associated with the line of business service ownership model, a funding model factor that is associated with the line of business service funding model, a governance model factor that is associated with the initial service governance model, and, in response to recognizing an absence of an eco-system definition, an eco-system status factor that defines a mature enterprise service portfolio as a function of identified entities;

select a set of the plurality of functionality attributes that are interdependent and applicable to the implemented service as a function of the evaluating the service with respect to the functionality attributes, wherein the set of functionality attributes is less than a totality of the plurality of the different functionality attributes and comprises a minimum number of backend systems, static end-point types, and an initial security setting identification;

select a set of technical attribute-service evolution factors that are each associated with one of the determined set of the functionality attributes and different from the business attribute-service evolution factors, for use in re-factoring the implemented service, wherein the set of technical attribute-service evolution factors comprises a scope factor that is associated with the minimum number of backend systems, an end-point type factor that is associated with the static end-point types, a security attributes factor that is associated with the initial security setting identification, and, in response to an observation of an absence of a static policy, a static policy factor that provides an operational policy; and re-factor the implemented service with both of the selected set of business attribute-service evolution factors and the selected set of technical attribute-service evolution factors.

10. The article of manufacture of claim 9, the program code comprising instructions which, when executed on the computer system processing unit, further causes the computer system processing unit to:

define a distinct end-point for the implemented service over its lifecycle as a function of an influence driving the re-factoring; and retire the implemented service upon an occurrence of the distinct end-point.

11. The article of manufacture of claim 9, the program code comprising instructions which, when executed on the computer system processing unit, causes the computer system processing unit to:

provide an executive business dashboard interface; and enable a business user to manage the at least one of the evaluating the implemented service, the determining the sets of business-scope or functionality attributes, the selecting the sets of business attribute-service evolution or technical attribute-service evolution factors and the re-factoring of the implemented service through the executive business dashboard.

12. The article of manufacture of claim 9, the program code comprising instructions which, when executed on the computer system processing unit, causes the computer system processing unit to define at least one of the business-scope attributes and the functionality attributes that are applicable to the implemented service with a scale as a function of an implementation requirement.

13. A programmable device comprising:
a processing unit;
a computer-readable memory in communication with the processing unit;
a tangible computer-readable storage device comprising program instructions stored on the tangible computer-readable storage device; and
a network interface in communication with the processing unit;
wherein the processing unit is configured by executing the program instructions stored on the tangible computer-readable storage device to:

evaluate, in response to an update of a product of an implemented service, an implemented service with respect to each of a plurality of line-of-business business-scope attributes and with respect to each of a plurality of line-of-business functionality attributes that are different from the business-scope attributes;

select a set of the plurality of business-scope attributes that are interdependent and applicable to the implemented service as a function of the evaluating the service with respect to the business-scope attributes, wherein the set of business-scope attributes is less than a totality of the plurality of the business-scope attributes and comprises a line of business service ownership model, a line of business service funding model, and an initial service governance model;

select a set of business attribute-service evolution factors that are each associated with one of the determined set of business-scope attributes for use in re-factoring the implemented service, wherein the set of business attribute-service evolution factors comprises an ownership model factor that is associated with the line of business service ownership model, a funding model factor that is associated with the line of business service funding model, a governance model factor that is associated with the initial service governance model, and, in response to recognizing an absence of an eco-system definition, an eco-system status factor that defines a mature enterprise service portfolio as a function of identified entities;

select a set of the plurality of functionality attributes that are interdependent and applicable to the implemented service as a function of the evaluating the service with respect to the functionality attributes, wherein the set of functionality attributes is less than a totality of the plurality of the different functionality attributes and comprises a minimum number of backend systems, static end-point types, and an initial security setting identification;

select a set of technical attribute-service evolution factors that are each associated with one of the determined set of the functionality attributes and different from the business attribute-service evolution factors, for use in re-factoring the implemented service, wherein the set of technical attribute-service evolution factors comprises a scope factor that is associated with the minimum number of backend systems, an end-point type factor that is associated with the static end-point types, a security attributes factor that is associated with the initial security setting identification, and, in response to an observation of an absence of a static policy, a static policy factor that provides an operational policy; and re-factor the implemented service with both of the selected set of business attribute-service evolution factors and the selected set of technical attribute-service evolution factors.

14. The programmable device of claim 13, wherein the processing unit is further configured by executing the program instructions stored on the tangible computer-readable storage device to:

define a distinct end-point for the implemented service over its lifecycle as a function of an influence driving the re-factoring; and retire the implemented service upon an occurrence of the distinct end-point.

15. The programmable device of claim 14, wherein the processing unit is further configured by executing the program instructions stored on the tangible computer-readable storage device to:

provide an executive business dashboard interface; and enable a business user to manage the at least one of the evaluating the implemented service, the determining the sets of business-scope or functionality attributes, the selecting the sets of business attribute-service evolution or technical attribute-service evolution factors and the re-factoring of the implemented service through the executive business dashboard.

* * * * *